(12) United States Patent
Heieie

(10) Patent No.: US 9,631,741 B2
(45) Date of Patent: *Apr. 25, 2017

(54) CASING PULLER

(71) Applicant: Southeast Directional Drilling, LLC, Casa Grande, AZ (US)

(72) Inventor: John M. Heieie, Casa Grande, AZ (US)

(73) Assignee: Southeast Directional Drilling, LLC, Casa Grande, AZ (US)

( * ) Notice: Subject to any disclaimer, the term of this patent is extended or adjusted under 35 U.S.C. 154(b) by 150 days.

This patent is subject to a terminal disclaimer.

(21) Appl. No.: 14/739,600

(22) Filed: Jun. 15, 2015

(65) Prior Publication Data

US 2015/0276090 A1    Oct. 1, 2015

Related U.S. Application Data

(62) Division of application No. 13/660,119, filed on Oct. 25, 2012, now Pat. No. 9,085,945.

(51) Int. Cl.
| F16L 1/032 | (2006.01) |
| E21B 7/28  | (2006.01) |
| E21B 10/28 | (2006.01) |
| F16L 1/028 | (2006.01) |
| F16L 1/06  | (2006.01) |

(52) U.S. Cl.
CPC ............... *F16L 1/032* (2013.01); *E21B 7/28* (2013.01); *E21B 10/28* (2013.01); *F16L 1/028* (2013.01); *F16L 1/065* (2013.01)

(58) Field of Classification Search
CPC ............................ F16L 1/028; F16L 2101/50
USPC ............... 405/174, 184, 184.1, 184.2, 184.3
See application file for complete search history.

(56) References Cited

U.S. PATENT DOCUMENTS

| 1,374,833 A | 4/1921 | Dooley |
| 1,537,359 A | 5/1925 | Lewis |
| 1,625,909 A | 4/1927 | Price |
| 1,638,494 A | 8/1927 | Lewis |
| 2,180,589 A | 11/1939 | Hodges |
| 2,848,050 A | 8/1958 | Woollley |
| 5,209,605 A | 5/1993 | Cherrington |
| 2003/0147700 A1 | 8/2003 | Carter et al. |

Primary Examiner — Thomas B Will
Assistant Examiner — Katherine Chu
(74) Attorney, Agent, or Firm — Honigman Miller Schwartz and Cohn LLP

(57) ABSTRACT

A casing puller includes a body and at least one arm. The body has first and second ends, at least one end connectable to a drill pipe. The body defines a longitudinal axis and sized for insertion into a casing pipe. The at least one arm is disposed on the body and moves between a stowed position and a deployed position. The at least one arm extends away from the longitudinal axis when in its deployed position and is arranged to engage an arm receiver defined by the casing pipe.

15 Claims, 9 Drawing Sheets

Casing Installation Process

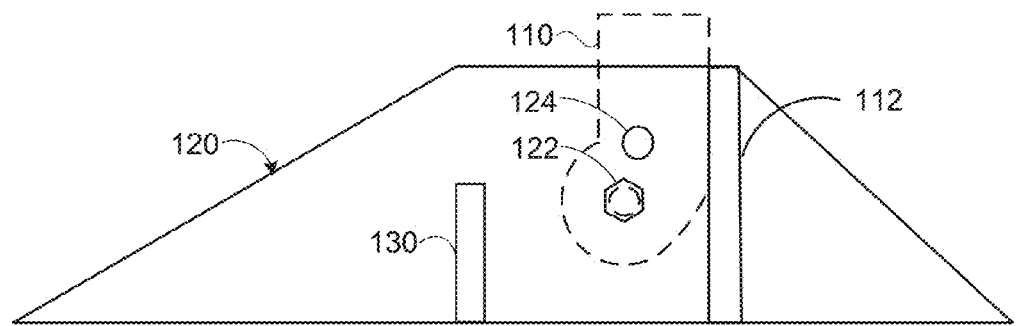
FIG. 8A – Deployed Position
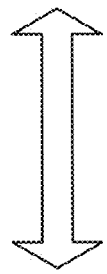
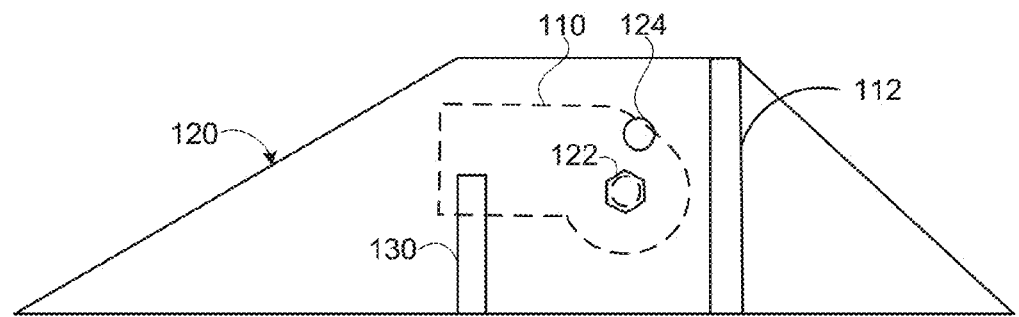
FIG. 8B – Stowed Position

CASING PULLER

CROSS REFERENCE TO RELATED APPLICATIONS

This U.S. patent application is a divisional of, and claims priority under 35 U.S.C. §121 from, U.S. patent application Ser. No. 13/660,119, filed on Oct. 25, 2012, which is hereby incorporated by reference in its entirety.

TECHNICAL FIELD

This disclosure relates to a casing puller for pulling a casing pipe.

BACKGROUND

Directional drilling or boring is generally used for installing infrastructure such as telecommunications and power cable conduits, water lines, sewer lines, gas lines, oil lines, product pipelines, and environmental remediation casings. Directional drilling allows crossing waterways, roadways, shore approaches, congested areas, environmentally sensitive areas, and areas where other methods are costlier or not possible. The technique has extensive use in urban areas for developing subsurface utilities as it helps in avoiding extensive open cut holes. The use may require that the operator have complete information about existing utilities so that he/she can plan the alignment to avoid damaging those utilities.

In general, a pipeline can be installed with a directional drilling apparatus under a barrier, such as highway, road, waterway, building, or other surface obstruction without disturbing the barrier. Installation of the pipeline under the barrier typically entails drilling a hole under the barrier and then advancing a pipeline section through the hole.

SUMMARY

One aspect of the disclosure provides a casing puller which includes a body and at least one arm disposed on the body. The body has first and second ends. At least one end is connectable to a drill pipe. The body defines a longitudinal axis and is sized for insertion into a casing pipe. The at least one arm is disposed on the body and moves between a stowed position and a deployed position. The at least one arm extends away from the longitudinal axis when in its deployed position and is arranged to engage an arm receiver defined by the casing pipe.

Implementations of the disclosure may include one or more of the following features. In some implementations, the at least one arm is pivotally connected to the body, and rotates between its stowed and deployed positions. The at least one arm may be substantially parallel to the longitudinal axis in its stowed position. In some examples, the at least one arm is slidably received by the body and slides between its stowed and deployed positions. The at least one arm may slide between its stowed and deployed positions. Additionally or alternately, the at least one arm may be spring biased toward its deployed position.

In some implementations, the body includes a stem a stem extending along the longitudinal axis, and first and second fins disposed on the stem and extending away from the longitudinal axis. Each fin is circumferentially spaced from the other about the stem. In some examples, the body further includes third and fourth fins, where all of the fins are equally spaced circumferentially about the stem. Additionally or alternatively, the stem may have a cylindrical shape. A support bracket may connect two adjacent fins. Each fin may define a receptacle housing a respective arm. The receptacle may define an aperture arranged for allowing manual movement of the at least one arm between its stowed and deployed positions.

In some implementations, the casing puller includes a connector disposed on one of the first or second ends of the body. The connector defines an aperture for releasably connecting to a drill pipe. The connector may swivel about the one of the first or second ends.

Another aspect of the disclosure provides a method of inserting a casing pipe into a bore. The method includes inserting a casing puller into a casing pipe. The casing puller defines a longitudinal axis and has an arm moveable between a stowed position and a deployed position. The method also includes moving the arm to its deployed position to engage an arm receiver defined by the casing pipe, moving the casing puller in a first direction wherein the deployed arm maintains engagement with the arm receiver of the casing pipe, and moving the casing puller in a second direction, causing the arm to move to is stowed position, disengaging the arm from the arm receiver of the pipe casing.

In some implementations, moving the arm between its stowed and deployed positions includes rotating the arm about a fulcrum. Moving the arm between its stowed and deployed positions may include sliding the arm, and more specifically linearly sliding the arm. In some example, after moving the casing puller in the second direction, the method includes rotating the casing puller about its longitudinal axis in the casing pipe to an orientation unregistered from the arm receiver, and removing the casing puller from the casing pipe. The method may include moving the casing puller in the first direction to remove the casing puller from the casing pipe. The arm receiver may include an aperture or groove defined by the casing pipe.

Another aspect of the invention includes a casing pulling system including a casing pipe, a body, and at least one arm disposed on the body. The casing pipe defines an arm receiver. The body has first and second ends, and at least one end is connectable to a drill pipe. The body defines a longitudinal axis and is sized for insertion into the casing pipe. At least one arm is disposed on the body and moves between a stowed position and a deployed position. The at least one arm extends away from the longitudinal axis when in its deployed position and is arranged to engage an arm receiver. In some examples, the at least one arm is pivotally connected to the body, and rotates between its stowed and deployed positions. The at least one arm may be substantially parallel to the longitudinal axis in its stowed position. The at least one arm may be slidably received by the body and slides between its stowed and deployed positions; specifically, the at least one arm may linearly slide between its stowed and deployed positions. The at least one arm may be spring biased toward its deployed position.

In some implementations, the body includes a stem extending along the longitudinal axis, and first and second fins disposed on the stem and extending away from the longitudinal axis. Each fin may be circumferentially spaced from the other about the stem. In some examples, the body further includes third and fourth fins, where all of the fins are equally spaced circumferentially about the stem. The stem may be of a cylindrical shape. Additionally or alternatively, a support bracket connects two adjacent fins. Each fin may define a receptacle housing a respective arm. In some examples, the receptacle defines an aperture arranged for allowing manual movement of the at least one arm between its stowed and deployed positions.

In some implementations, a connector is disposed on one of the first or second ends of the body. The connector defines an aperture for releasably connecting to a drill pipe. The connector may swivel about the one of the first or second ends.

The casing pipe may define first and second apertures. Each aperture is circumferentially spaced from the other. In some examples, third and fourth apertures are circumferentially spaced at an equal arc distance from the other.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 8A is a side view of an exemplary arm of casing puller in its deployed position.

FIG. 8B is a side view of an exemplary arm of casing puller in its stowed position.

Like reference symbols in the various drawings indicate like elements.

DETAILED DESCRIPTION

Figure 1:
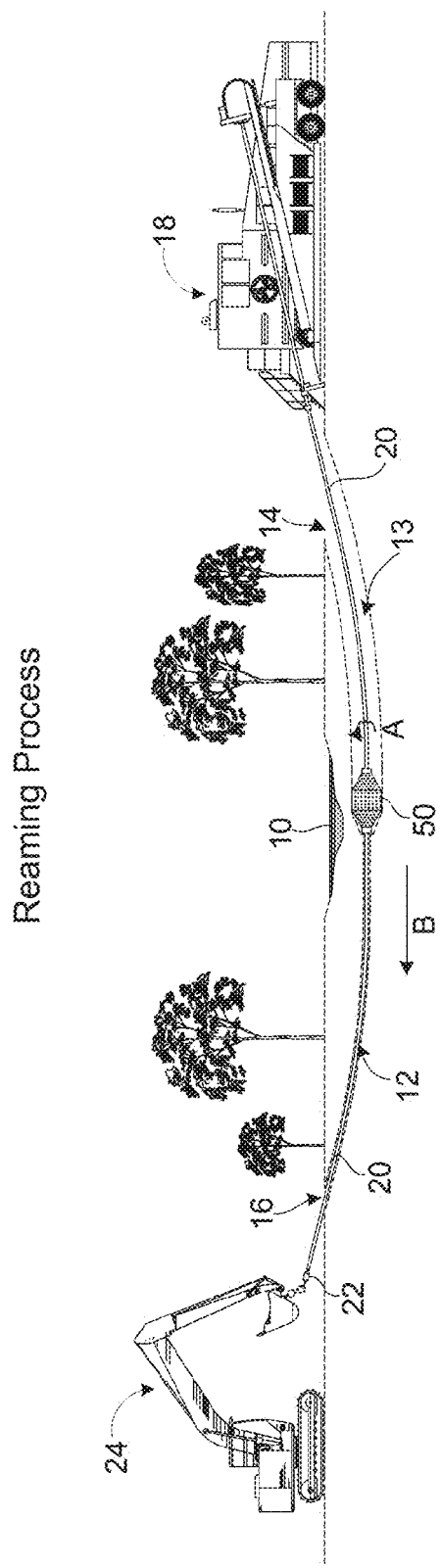
FIG. 1 is a schematic view illustrating a reamer enlarging a pilot bore for installing the casing pipe.
Figure 2:
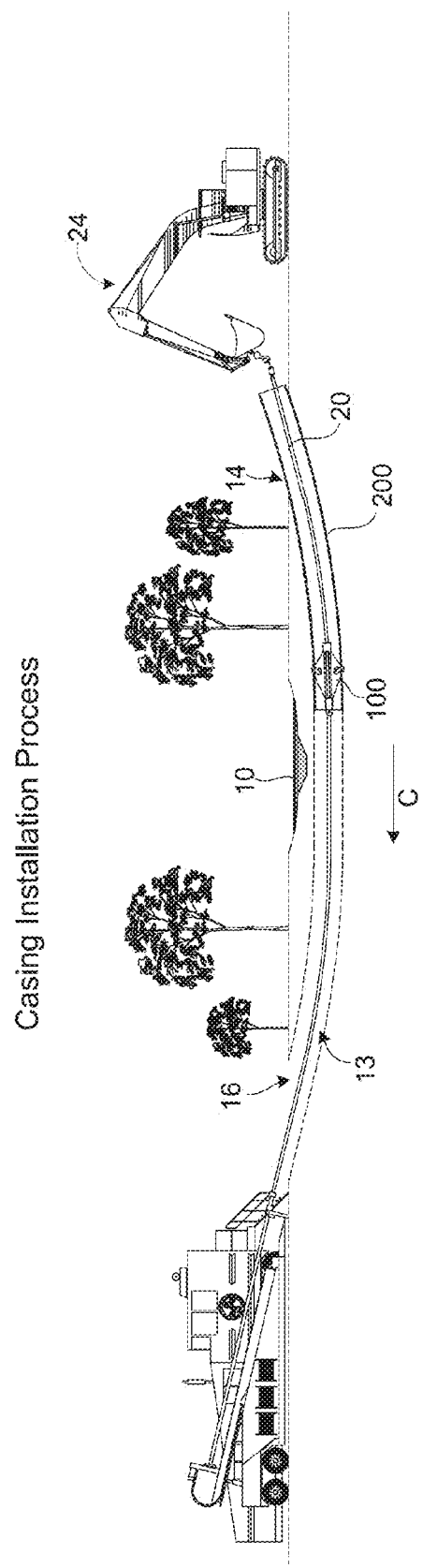
FIG. 2 is a schematic view illustrating a casing puller pulling a casing into a bore.
Figure 3:
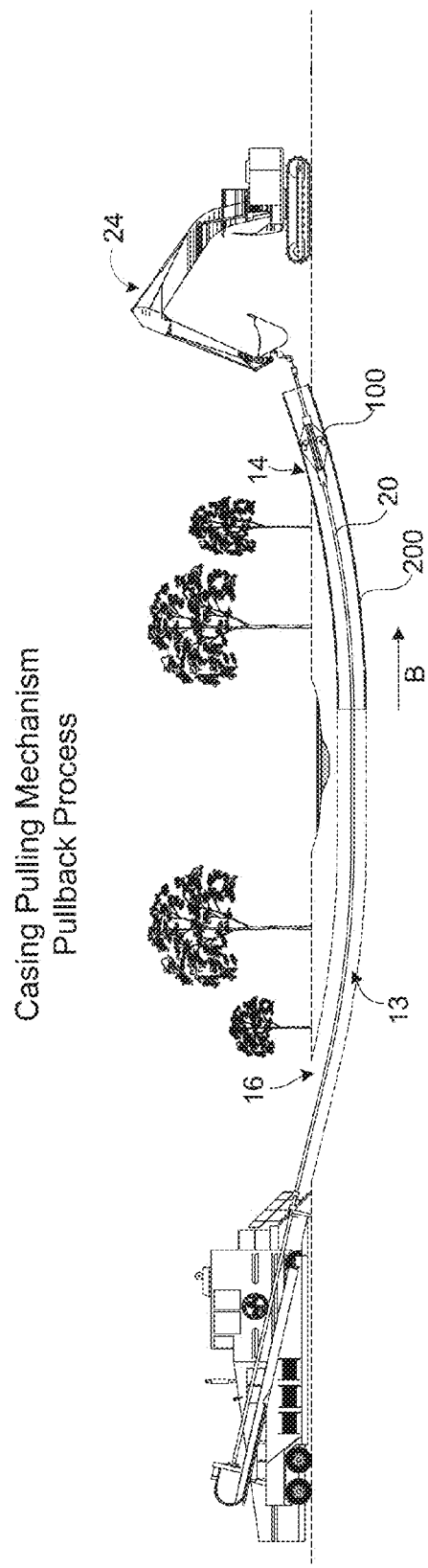
FIG. 3 is a schematic view illustrating retrieval of a casing puller from a bore.
Figure 4:
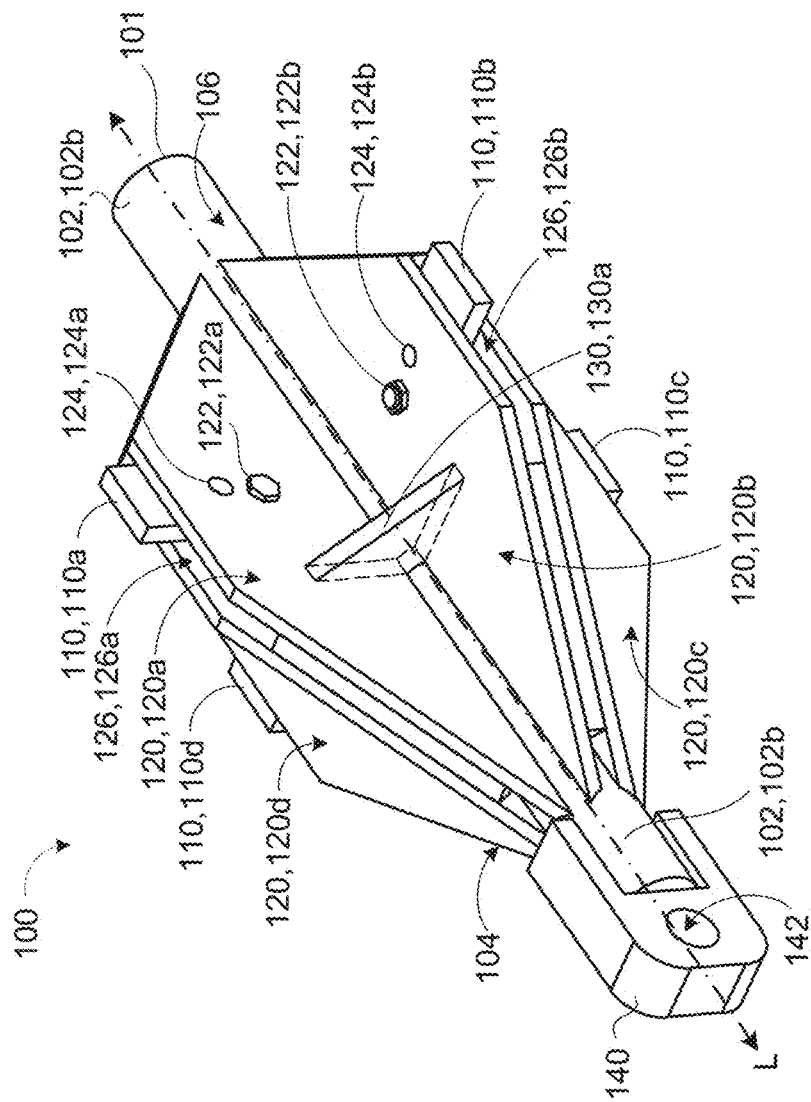
FIG. 4 is a perspective view of an exemplary casing puller system.
Figure 5:
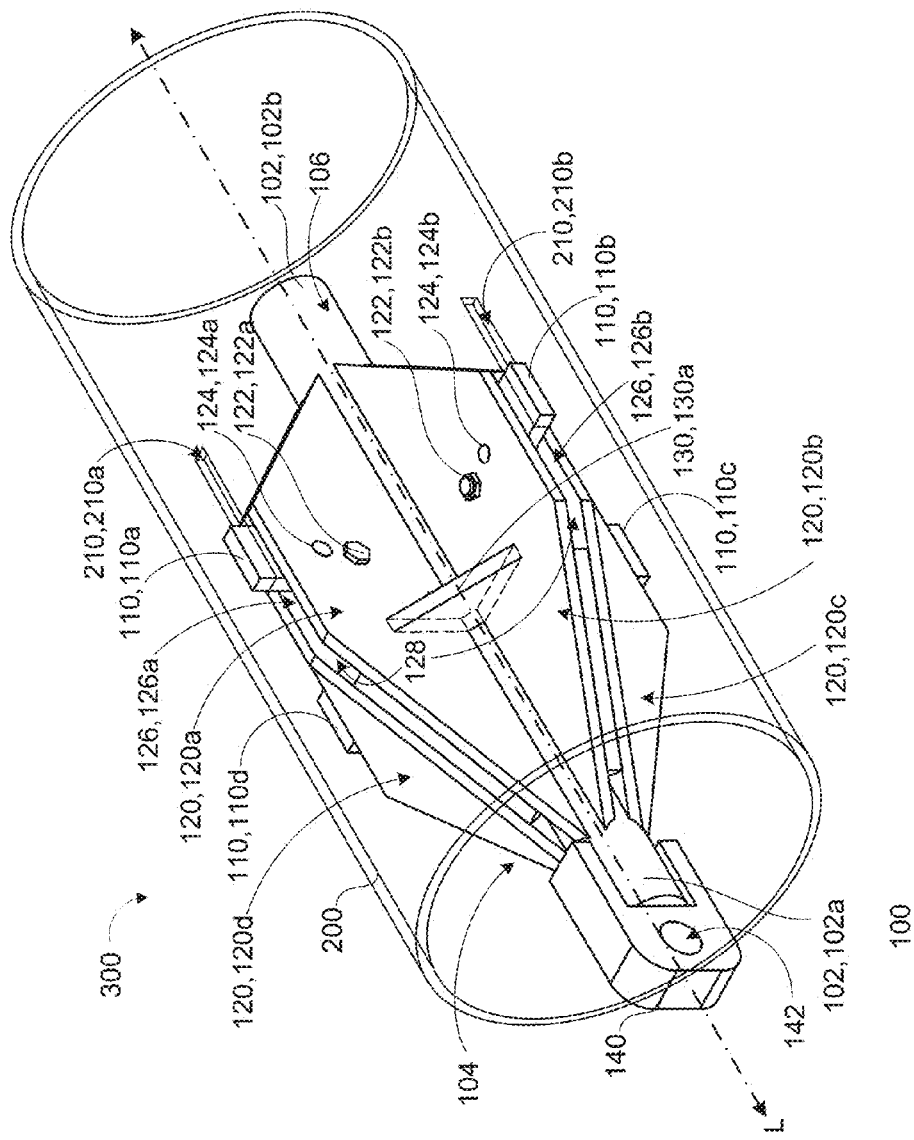
FIG. 5 is a perspective view of an exemplary casing puller.
Figure 6:
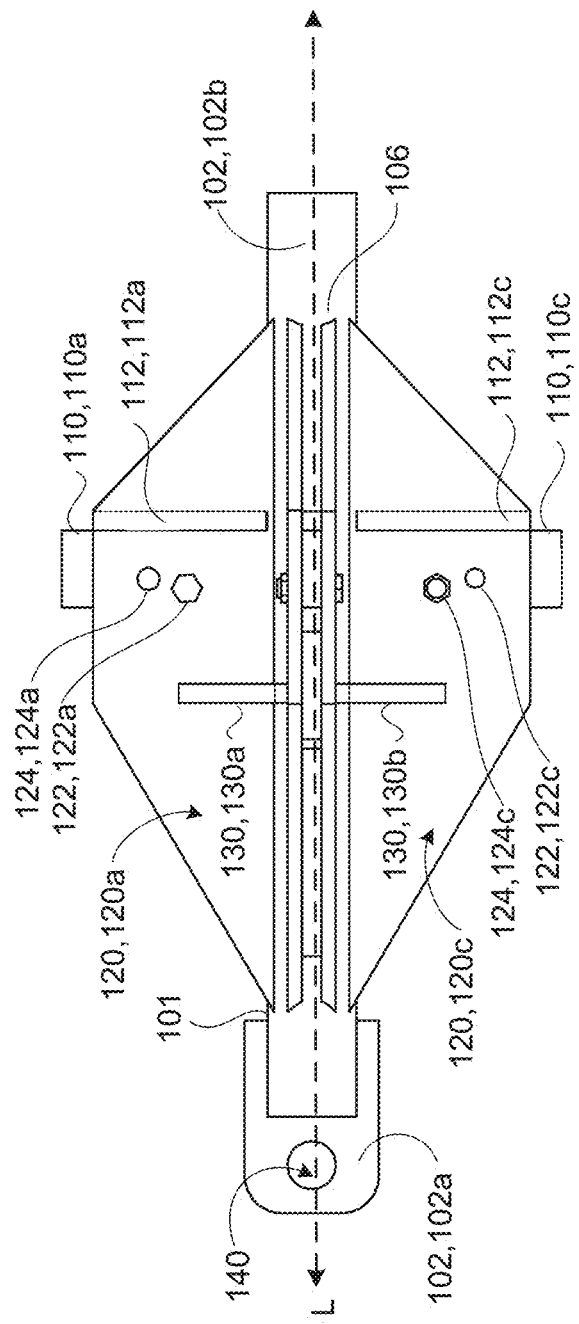
FIG. 6 is a side view of the exemplary casing puller shown in FIG. 5.
Figure 7:
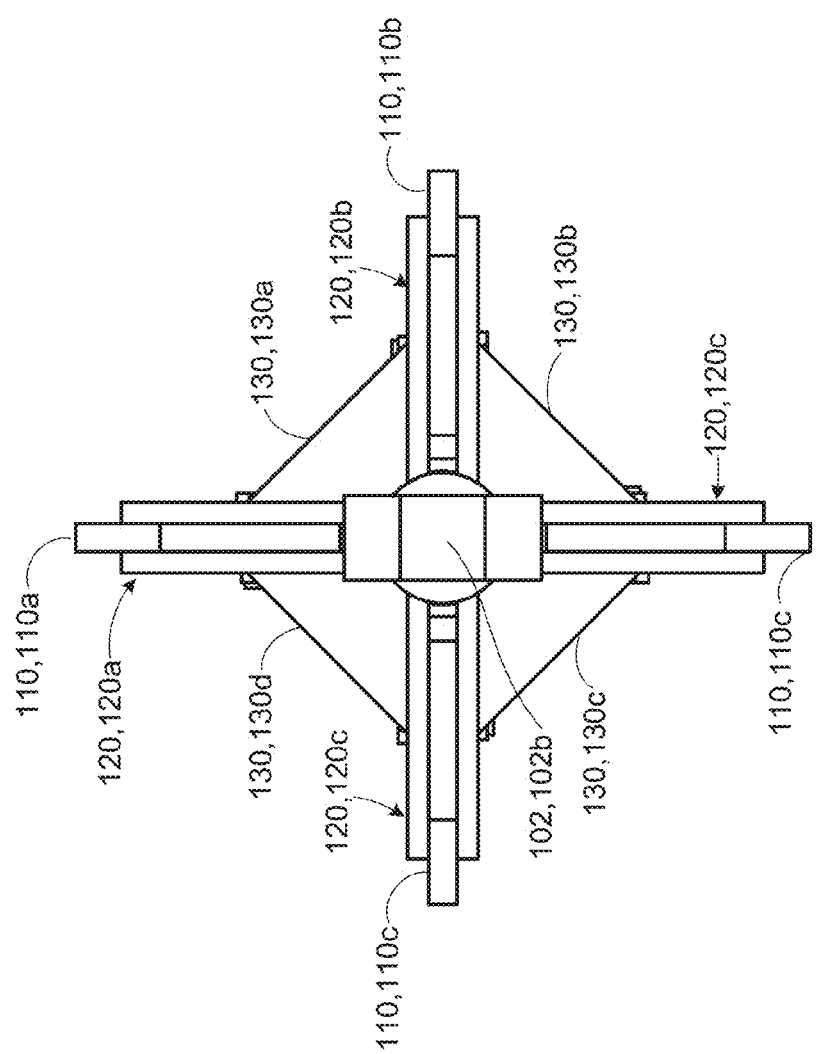
FIG. 7 is a front view of the exemplary casing puller shown in FIG. 5.

Referring to FIGS. 1-3, a directional drilling method and apparatus 18 may be used to install a pipeline under a barrier 10, such as highway, road, waterway, building, or other surface obstruction without disturbing the barrier 10. In some implementations, installing a pipeline under a barrier includes placing a drilling or boring apparatus 18 on one side of the barrier 10, and directionally drilling a passageway 12 under the barrier 10. The passageway 12, or bore, is of sufficient size to allow one or more sections of pipe 20 to be pushed or pulled lengthwise through the bore from one side of the barrier 10 to the other. The installed section can be welded into the pipeline and tested.

Directional drilling may include drilling a pilot hole 12 under the barrier 10 as a beginning of the directional drill process. The pilot hole 12 can be achieved by excavation using fluid jetting or a down-hole motor and drill. Depending on the condition of the soil, the pilot bore 12 is formed along a pre-determined alignment in which the path is selected by conventional methods. The typical pilot hole 12 on most large rigs 18 is 9⅞", but can vary depending on the soil conditions and rig size. A drill head 22 attached to the end of a drill pipe 20 drills or cores the pilot hole 12. Drilling fluid is pumped through the drill pipe 20 to a drill head and jetted through or pumped through a drill motor. The drill fluid lubricates the drill stem and carries out cut debris to the surface. The drill fluid is then recycled and re-injected into the drill stem 20. Forming the pilot hole 12 can take several days, depending on the condition of the soil and may require changing of the drill pipe 20 or drill head 22.

When drillers start the directional drilling process, they consider the path that the drill pipe 20 will follow, specifically the depth and angle that the drill pipe 20 has to take to get to the other side of the barrier 10. The drilling path is usually determined before the start of the drilling process based on the geology of the earth. Once the drilling process is initiated, the drillers constantly take measurements and analyze the depth and the inclination of the bore 12. These measurements are important to verify that the drilled path is consistent with the planned path. In some examples, a down-hole motor is used. The down-hole motor is housed in a drill string 20 directly above the drill bit 22. The down-hole motor allows the drill bit 22 to turn while the drill string 20 stays fixed. A measurement tool may be attached to the down-hole motor to provide the drillers with continuous measurements of depth and inclination of the bore 12.

The directional drilling may form a curved or non-linear pilot hole 12 extending from one end 14 of the barrier 10 to the another end 16 of the barrier 10. Once formed, the pilot hole 12 is enlarged with a reaming process. The reaming process employs a reamer 50, which is sometimes referred to as a hole opener. Reamers 50 come in different shapes and sizes and vary depending on the soil conditions and density of the soil; typically, a fly cutter is used in good ground conditions. The reaming pass(es) can be done in several steps, depending on the size of the hole. For example, a 42" diameter finish hole may need 3 to 5 different ream passes of 14", 20", 34", and 42" diameters. The reaming process includes attaching a reamer 50 to the drill string 20 (e.g., drill pipe) and rotating and pushing and/or pulling the reamer 50 through the pilot bore 12. The reaming process may include pumping a drill fluid (e.g., water or slurry) through the drill pipe 20 to the reamer 50. The excavated soil is suspended in the drill fluid and then brought to the surface and recycled. In some examples, when the reamer is attached to the drill string 20, a drill pipe 20 extends on both sides of the reamer 50, thus allowing for the drill string to be in the hole 12, 13 at all times. The reaming process can take a significant amount of time depending on the condition of the soil.

After a desired hole size has been achieved and the reamer 50 has passed through the hole 12 completely, a mud pass or packer reamer may be passed through the reamed hole 13. The mud pass or packer reamer assures that the hole 13 is clean of all excavated material and that the drill fluid has filled the hole completely, to allow for a smooth lubricated pull back of the pipe, avoiding friction of a pull section.

When rock or other hard materials are encountered in the drilling operation, problems can arise which cause the installation of a casing pipe 200 to be difficult and expensive. For example, when installing a large-diameter pipeline, such as a 36" or 40" pipeline under an interstate highway that may be 300 feet wide, massive forces can be present during the directional drilling process. The large forces can result from encountering hard materials along the drill path, making it difficult, if not impossible, to form the bore 12 and subsequently pull a casing pipe 200 throughout an enlarged bore 13.

The need for improvements is particularly long-felt in directional drilling for pulling a casing 200 through the enlarged bore 13.

FIGS. 1-3 illustrate stages of an exemplary drilling process. FIG. 1 illustrates drilling a pilot bore 12 under a barrier 10, such as a roadway. A drilling rig 18 carrying the drill pipe 20 is driven to the drilling location and positioned by a first end 14 of the barrier 10. A drill string 20 housing a down-hole motor is located directly above the drill bit 22. The down-hole motor allows the drill bit to turn while the drill string 20 stays fixed.

Once the first end 14 of the barrier 10 is opened, the directional drilling rig 18 can be used to drill the pilot bore 12 from the first end 14 of the barrier 10 to a second end 16 of the barrier. The drilling rig 18 may include a powered rotator (not shown) for rotating a drill pipe 20 carrying a drill bit or drill head 22. The drilling rig 18 may be mounted on or includes an advancer for advancing the drilling operation. For example, the drilling rig 18 can be mounted on tracks that allow the entire drilling rig 18 to move and advance the drilling operation. The drilling rig may be a carrier drilling rig 18 able to drive to different location for drilling.

FIG. 1 also illustrates enlarging the pilot bore 12 to an enlarged bore 13 having a larger diameter than the pilot bore 12 using a reamer 50. The drill pipe 20 is operatively connected to a drilling rig 18 positioned near the second end 116 of the barrier 10. The reamer 50 is coupled to the drill pipe 20 extending through the pilot bore 12. The drilling rig 18 rotates, pushes and/or pulls the drill pipe 20 and attached reamer 50 through the pilot bore 12 to enlarge the size of the pilot bore 12. Enlarging the pilot bore 12 to the enlarged bore 13 can be accomplished by rotating and horizontally advancing the drill pipe 20 with the reamer 50 connected thereto. The reamer 50 may enlarge the pilot bore 12 from the second end 16 to the first end 14 beneath the barrier 10, from the first end 14 to the second end 16, or in both directions. While advancing the reamer 50, a guide assembly steers the reamer 50 along the path of the pilot bore 12. Since the reamer 50 is attached at both ends to a drill pipe 20 extending between the first and second ends 14, 16 of the barrier 10, a drilling rig 18 may be used from either side of the barrier 10 to push and/or pull the reamer 50 through the pilot bore 12.

During the drilling operation, the drill pipe 20 and the reamer 50 receive drilling fluid from a drilling fluid pump in fluid communication with a tank. The drilling fluid pump pumps drilling fluid from the tank through flexible tubing (or any suitable conduit), the rotatable coupling, and into the drill pipe 20. One or more small ports that formed in the reamer 50 deliver the drilling fluid to the region of the cutting. The flowing drilling fluid cools the reamer 50 and aids in lubricating the cutting of the earth and rock to enlarge the pilot bore 12 to the desired enlarged bore 13. During a reaming pass, the pilot bore 112 can be used to supply fluids to the reamer 50 while the enlarged bore 13 behind the reamer 50 can be used for removing the cut debris or cuttings. As the enlarged bore 13 is being drilled, it remains substantially filled with drilling fluid and cuttings.

The drilling rig 18 rotates the coupled drill pipe 20 in direction of rotation A. While the direction of rotation A, whether clockwise or counterclockwise, is not critical to the drilling operation, when using a threaded connection, the direction of rotation should not unscrew the connection. When connected to the drill pipe 20, the reamer 50 rotates with the drill pipe 20 and enlarges the pilot bore 12.

The drill pipe 20 and reamer 50 can be selectively moved or advanced in the forward and reverse direction B, C of a drilling direction. During the drilling operation, the reamer 50 is carefully advanced horizontally in the drilling direction B to advance from one end 14, 16 of the barrier 10 to another (e.g., from the second end 16 toward the first end 14). Upon reaching the opposite end 14, 16 (e.g., the first end 14), the enlarged bore 13 is completed, and the reamer 50 is removed from the drill pipe 20. More than one reaming pass may be used to enlarge the pilot bore 12 to the desired diameter for the enlarged bore 13. A reaming pass can be made from either the first end 14 to the second end 16 or vice versa.

Referring to FIG. 2, after the reaming process is complete, a casing pipe 200 may be pulled into the reamed hole 13. The passageway 13 is of sufficient size to allow one or more sections of casing pipe 200 to be pushed or pulled lengthwise through the bore 13 from one side 14 of the barrier 10 to the other side 16. A casing puller 100 may be used to pull the casing pipe 200 from the second hole 16 to the first end 14, or vice versa. The casing puller 100 may be releasably attached to a drill pipe 20. The drill pipe 20 may be connected to an excavator 24 on the first end 114 of the barrier 110 and to the drilling rig 18 on the second end 16 of the barrier 10. The drill pipe 20 guides the casing puller 100 from one end 14 to the other end 16. When the casing puller 100 reaches the second end 16 of the barrier 10, the pipe casing 200 extends throughout the length of the bore 13.

Referring to FIG. 3, when the drilling rig 18 completes pulling the casing puller 100 and the casing pipe 200 is installed throughout the bore 13, an excavator 24 retrieves the casing puller 100 from the first end 14 of the barrier 10. The excavator 24 pulls the casing puller 100 in a direction C opposite to the direction B of pushing the casing pipe 200 through the bore 13. In some examples, the casing puller 100 may be removed from the casing pipe 200 in the same direction as the casing pipe 200 into the bore 13.

Referring to FIGS. 4-8B, a casing puller system 300 includes a casing puller 100 and a casing pipe 200. The casing puller 100 is sized to be inserted into the casing pipe 200. The casing pipe 200 has an arm receiver 210 for receiving an arm 110 of the casing puller 100. After the drilling and reaming a bore 13, a casing pipe 200 is inserted into the bore and sometimes cement may be used to hold the casing 200 into place. The cement used to secure the casing pipe 200 to the bore prevents contamination of the fluid that is passing through.

The casing puller 100 includes a body 104 having first and second ends 102a, 102b. The body 104 defines a longitudinal axis L. The body 104 may be a cylindrical shape, a rectangular prism, a pentagonal prism, hexagonal prism, or any other shape. In some examples, a connector 140 is disposed on the first end 102a of the body 101. The connector may include an aperture 142 for releasably connecting to a drill pipe. The connector 140 may swivel about the first end 120a improving maneuvering of the system 300 when pulling it through the bore 13. In some examples, the connector 140 is fixed about the first end 120a. The connector 140 may be of any shape adapted to releasably connect to the drill pipe 20.

In some implementations, one or more arms 110 may be disposed on the body. Each arm 110 moves between two positions, a deployed position (FIG. 8A) and a stowed position (FIG. 8B). In the deployed position, the arm 110 engages an arm receiver 210 defined by the casing pipe 200, and extends away from the longitudinal axis L. The arm 110 and the arm receiver 210 may have complementary shapes. For example, the arm 110 may define a rectangular in shape, and therefore the arm receiver 210 may also be rectangular to receive the arm 110. In other examples, the arm 110 defines a square shape, and the arm receiver 210 is also a square to receive the arm 110 and complement its shape. The arm 110 may be of any shape including a sphere, a rectangle or and upside down rectangle, or any other shape. In some examples, the shape of the arm receiver 210 is not complementary to the shape of the arm 110.

In some implementations, the body 101 includes a stem 106. The stem 106 extends along the longitudinal axis L. The stem 102 may be a cylindrical shape (as shown), a triangular prism, a rectangular prism, a pentagonal prism, hexagonal prism, or any other suitable shape. One or more fins 120 may be disposed on the stem 106. The fins 120 extend away from the longitudinal axis L. The fins 120 may be circumferentially spaced from one another about the stem 106. In some examples, where the stem 106 has a triangular prism shape, the body 101 may include three fins 120 each disposed on one face of the triangular prism. In situations where the stem 106 has a hexagonal prism shape, the body 101 may include six fins 120. Other variations of the shape of the stem 106 and the number of fins 120 are possible as well.

In some implementations, each fin 120 defines a receptacle 126. Each receptacle 126 houses an arm 110. Each receptacle 126 defines an aperture 128 which allows the arm to manually move from its stowed position to its deployed position, as shown in FIGS. 8A and 8B. The arm pivotally connects to the body 101. The arm may be substantially perpendicular to the longitudinal axis L in its deployed position (FIG. 8A). The arm 110 may be substantially parallel to the longitudinal axis L in its stowed position, and housed within the aperture 128 (FIG. 8B). A bolt 122 may secure the arm to the fin 120 and may allow the arm 110 to pivotally rotate about the bolt 122. Therefore, the bolt 122 allows the arm 110 to pivot for its deployed to its stowed position.

In some implementations, the arm 110 is slidably received by the receptacle 126. The arm 110 is substantially perpendicular to the longitudinal axis L in both its stowed and deployed positions. In its stowed position, the arm 110 is substantially hidden within the receptacle 126. The arm 110 may be spring biased within the receptacle 126 to allow the arm 110 to linearly move from its stowed position to its deployed position.

In some implementations, each fin 120 includes first and second plates connected by a backing plate 112. The first and second plates may be substantially parallel and perpendicular to the longitudinal axis L, and releasably connected with one another by a bolt 122. The first and second plates define the receptacle 126. The first and second plates may each include an alignment hole 124 to align the plates together.

In some examples, a support bracket 130 connects two adjacent fins 120 to secure each fin 120 in its position and prevent the fins 120 from becoming flimsy after wear and tear of the casing puller 100. The bracket 130 may protrude from one fin 120a and extend to an adjacent fin 120b forming a fan-like shape between two fins 120a, 120b. The bracket 130 may be a rod connecting two adjacent fins 120a, 120b.

Figure 9:
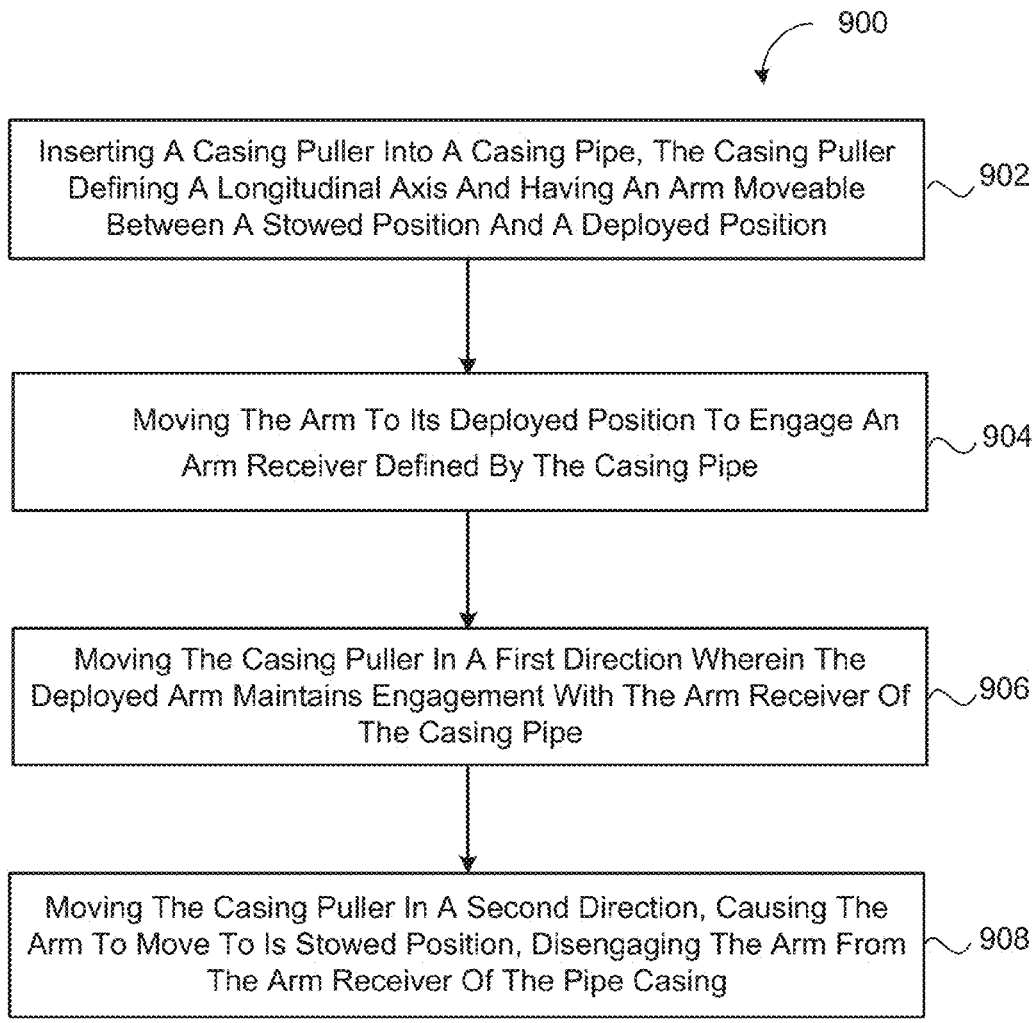
FIG. 9 provides an exemplary arrangement of operations for a method of pulling a casing pipe.

FIG. 9 provides an exemplary arrangement of operations for a method of pulling a casing pipe 200 through the length of a bore 13. The method incudes inserting 902 a casing puller 100 into a casing pipe 200 and moving 904 the arm 110 to its deployed position. The casing puller 100 defines a longitudinal axis L and includes an arm 110, which may be movable between a stowed position and a deployed position. The casing pipe 200 defines an arm receiver 210 that engages the arm 110 when in its deployed position. The arm receiver 210 may include an aperture or groove defined by the casing pipe 200. The arm receiver 210 and the arm 110 may have complimentary shapes so that the arm receiver 210 securely receives the arm 110.

The method also includes moving 906 the casing puller 100 in a first direction C wherein the deployed arm 110 maintains engagement with the arm receiver 210 of the casing pipe 200. The engagement of the casing puller 100 and the casing pipe 200 allows the drilling rig 18 to securely pull the casing pipe 200 throughout the bore 13. The method includes moving 908 the casing puller 100 in a second direction B, causing the arm 110 to move to its stowed position by disengaging the arm 110 from the arm receiver 210 of the casing pipe 200.

Several implementations may be considered to move the arm from a stowed position to a deployed position or vice versa. In some examples, the method includes rotating the arm 110 about a fulcrum. In some examples, the method includes sliding the arm 110 using a spring that connects the arm 110 to the body 104. The arm 110 may linearly slide in a direction perpendicular to the longitudinal axis L. Additionally or alternately, the method may include rotating the easing puller 100 about its longitudinal axis L in the casing pipe 200 to an orientation unregistered from the arm receiver 210. The rotation of the casing puller 100 disengages the arm 110 from the arm receiver 210 and allows pulling the casing puller 100 in the first direction C or in the second direction B.

A number of implementations have been described. Nevertheless, it will be understood that various modifications may be made without departing from the spirit and scope of the disclosure. Accordingly, other implementations are within the scope of the following claims.

What is claimed is:

1. A method comprising:
inserting a casing puller into a casing pipe, the casing puller comprising:
a body having first and second ends, at least one end connectable to a drill pipe, the body defining a longitudinal axis and sized for insertion into the casing pipe; and
at least one arm disposed on the body and moving between a stowed position and a deployed position, the at least one arm extending away from the longitudinal axis when in its deployed position and arranged to engage an arm receiver defined by the casing pipe;
wherein the body comprises:
a stem extending along the longitudinal axis; and
first and second fins disposed on the stem and extending away from the longitudinal axis, each fin circumferentially spaced from the other about the stem and defining a receptacle housing a respective arm;
moving the at least one arm to its deployed position to engage an a receiver defined by the casing pipe;
moving the casing puller in a first direction wherein the deployed at east one arm maintains engagement with the arm receiver of the casing pipe; and
moving the casing puller in a second direction, causing the at least one arm to move to its stowed position, disengaging the at least one arm from the arm receiver of the pipe casing.

2. The method of claim 1, wherein moving the at least one arm between its stowed and deployed positions comprises rotating the at least one arm about a fulcrum.

3. The method of claim 2, wherein the at least one arras is substantially parallel to the longitudinal axis in its stowed position.

4. The method of claim 1, wherein moving the at least one arm between its stowed and deployed positions comprises sliding the at least one arm.

5. The method of claim 4, wherein moving the at least one arm between its stowed and deployed positions comprises linearly sliding the at least one arm.

6. The method of claim 4, further comprising:
   after moving the casing puller in the second direction, rotating the casing puller about its longitudinal axis in the casing pipe to an orientation unregistered from the arm receiver; and
   removing the casing puller from the casing pipe.

7. The method of claim 6, further comprising moving the casing puller in the first direction to remove the casing puller from the casing pipe.

8. The method of claim 1, wherein the arm receiver comprises an aperture or groove defined by the casing pipe.

9. The method of claim 1, wherein the at least one arm is spring biased toward its deployed position.

10. The method of claim 1, wherein the body further comprises third and fourth fins, all of the fins equally spaced circumferentially about the stem.

11. The method of claim 1, wherein the stem has a cylindrical shape.

12. The method of claim 1, wherein a support bracket connects two adjacent fins.

13. The method of claim 1, wherein the receptacle defines an aperture arranged for allowing manually movement of the at least one arm between its stowed and deployed positions.

14. The method of claim 1, wherein the casing puller further comprises a connector disposed on one of the first or second ends of the body, the connector defining an aperture for releasably connecting to the drill pipe.

15. The method of claim 14, wherein the connector swivels about the one of the first or second ends.

* * * * *

UNITED STATES PATENT AND TRADEMARK OFFICE
CERTIFICATE OF CORRECTION

PATENT NO. : 9,631,741 B2
APPLICATION NO. : 14/739600
DATED : April 25, 2017
INVENTOR(S) : John M. Heieie It is certified that error appears in the above-identified patent and that said Letters Patent is hereby corrected as shown below:

In the Claims

At Column 8, Claim number 1, Line number 53 should read, "moving the at least one arm to its deployed position to engage an arm receiver defined by the casing pipe;"

At Column 8, Claim number 1, Line 55 should read, "moving the casing puller in a first direction wherein the deployed at least one arm maintains engagement with the arm receiver of the casing pipe; and"

At Column 8, Claim number 3, Line 65 should read, "The method of claim 2, wherein the at least one arm is substantially parallel to the longitudinal axis in its stowed position."

Signed and Sealed this
Thirteenth Day of June, 2017

Joseph Matal
*Performing the Functions and Duties of the
Under Secretary of Commerce for Intellectual Property and
Director of the United States Patent and Trademark Office*